Sept. 14, 1965　　　P. R. BANTA ETAL　　　3,205,606
FISHING APPARATUS
Filed April 13, 1964　　　　　　　　　　　2 Sheets-Sheet 1
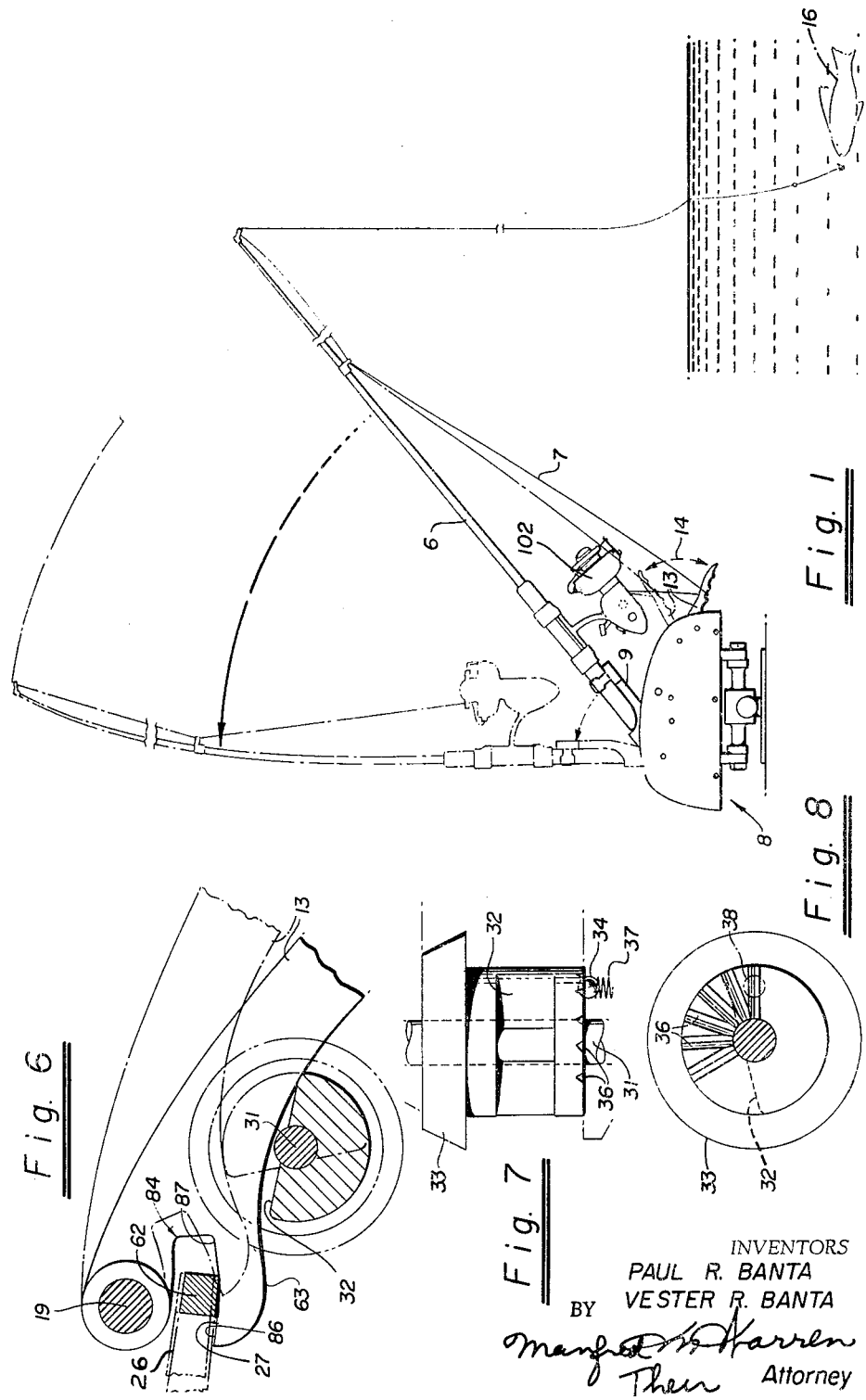
INVENTORS
PAUL R. BANTA
VESTER R. BANTA
BY
Attorney Sept. 14, 1965     P. R. BANTA ETAL     3,205,606
FISHING APPARATUS
Filed April 13, 1964                    2 Sheets-Sheet 2
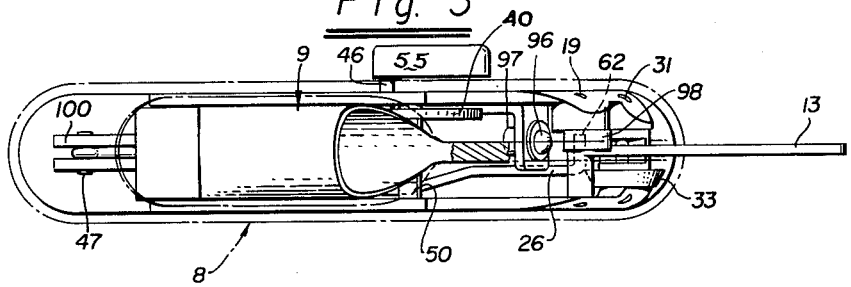
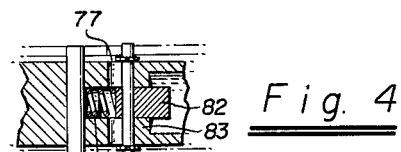
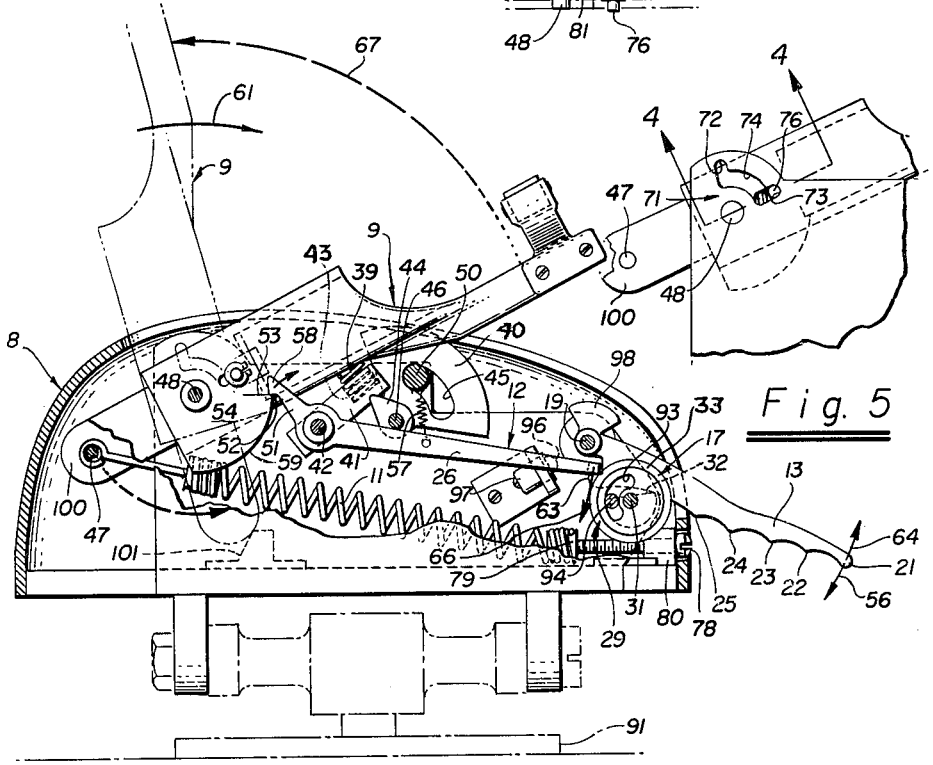
INVENTORS
PAUL R. BANTA
VESTER R. BANTA
BY
Attorney

United States Patent Office 3,205,606
Patented Sept. 14, 1965

3,205,606
FISHING APPARATUS
Paul R. Banta, 831 Grand Ave., Marysville, Calif., and Vester R. Banta, 566 Bunce Road, Yuba City, Calif.
Filed Apr. 13, 1964, Ser. No. 359,519
6 Claims. (Cl. 43—15)

The present application is a continuation-in-part of our copending application Serial No. 279,899, filed May 13, 1963, and now abandoned.

The present invention relates generally to apparatus for holding fishing rods, and more particularly to apparatus for moving a fishing rod and line to hook a fish in response to its "bite" on the line.

Various devices are known in the art to assist the angler in making a strike, that is, to jerk the fishing line to secure the fish hook in the fish's mouth. Such devices generally include a movable rod holder which can be spring loaded and triggered for jerking movement upon a tug on the fishing line. Heretofore, however, various disadvantages have been found with prior arrangements. Conventional devices are generally insensitive to differences in the type or size of fish that is being fished for. Thus, although the angler may be seeking a relatively large specie of fish, it often will happen that a smaller unwanted fish trips the device. In addition, some types of fish may require a relatively quick response to nibbling at the line, before the fish discards the hook from its mouth, while other types characteristically take the bait and swim a short distance before the hook is positioned properly in the fish's mouth. Consequently, it is possible that the line can be jerked either prematurely or too late, depending upon the type of fish, and in either case the angler is unsuccessful in making the desired strike. Furthermore, prior art devices have no means for compensating for the various natural conditions. For example, a fisherman may desired to fish in very swift waters and the water current may apply such a great pressure on the line as to either trip the device without the presence of a fish or it may be so sensitive that a mere nibble would be sufficient to overcome the triggering device. Similar problems are encountered in surf fishing or in turbulent waters. Another problem with many prior devices is that they can not be used with fishing rods of different weights, and if suitable for a relatively light rod such prior devices are usually unable to move a heavier rod quickly enough to secure the fish hook firmly. Still another problem with prior devices is their inability to operate properly in shallow as well as deep water. Present devices do not have the controls necessary to select a light setting of the trigger so that a small force will set off the device while having at the same time a strong spring setting so that the force moving the rod will be strong enough and move quickly enough to overcome the resistance of many feet of line, heavy sinkers, etc. while fishing in deep water. A further disadvantage of conventional devices is that they are often somewhat complicated to set in a loaded or cocked position, and require separate parts each to be moved individually in order to set the device. Still another disadvantage of the prior devices is the potential danger to the fisherman when the heavy spring holding the holder in cocked position is inadvertently triggered and the holder is brought against the fisherman with great force.

Accordingly, it is an object of the present invention to provide an improved fishing apparatus of the character described which can be adjusted to respond in the desired manner while fishing for different sizes and types of fish. In this regard, the present invention enables sensitivity adjustment as to the force of the fish's tug on the line necessary to trigger movement of the fishing rod, and also adjustment as to the increment of movement of the line necessary to trigger the device.

Another object of the present invention is to provide apparatus of the character described which can be set in a cocked or loaded position in an extremely simple manner, requiring only a single short movement of the rod into its cocked position.

A further object of the invention is to provide apparatus of the type described that can be used as desired with fishing rods of different weights. Moreover, the present invention provides for an extra or booster force upon the initial movement of the rod to assist in overcoming the inertia of the rod and fish, with the usual spring loading then continuing to move the rod through its full extent of movement.

Still another object is to provide apparatus of the type described which has a trigger member that is easily accessible to operatively engage the fishing line, and which can be moved readily into an unobstructing inoperative position whereby the trigger member is protected from damage while not in use and the device becomes compact for ready storage.

An even further object is to provide apparatus of the type described which can be easily and securely mounted on a rigid structure such as the side of a boat, and which enables the fishing rod to be tilted at various angles whereby several rods can be positioned for use near one another on the same side of a boat. In this regard, the triggering mechanism of the present invention is not affected by variations in the angle of tilt of the rod.

A still further object is to provide apparatus of the type described which can be adjusted to respond in the desired manner while fishing under various natural conditions. In this regard, the present invention enables sensitivity adjustment as to the force of the fish's tug on the line necessary to trigger movement of the fishing rod while taking into account conditions such as swift running water, heavy winds, heavy surf and deep water.

Still another object of the invention is to provide apparatus responsive to the presence and absence of a fishing rod so that the apparatus cannot move from a cocked position unless a fishing rod is present in the holder.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings:

FIGURE 1 is a side elevation view of a fishing apparatus embodying the present invention, and retaining a fishing rod, reel and line;

FIGURE 2 is an enlarged side elevation view, shown partially broken away and in cross section, of the apparatus of FIGURE 1, with dotted lines indicating the operative movement of the apparatus;

FIGURE 3 is a top plan view of the structure shown in FIGURE 2 with the cover shown in phantom to more clearly show the operating parts;

FIGURE 4 is a cross sectional fragmentary view taken along the plane of line 4—4 in FIGURE 5;

FIGURE 5 is a fragmentary side view of the safety mechanism of the structure shown in FIGURE 2 with the mechanism shown in the locked position;

FIGURE 6 is an enlarged fragmentary side view of the trigger mechanism of the structure shown in FIGURE 2, with the trigger arm shown in a second position by broken lines;

FIGURE 7 is an enlarged fragmentary view of the trigger setting mechanism of the structure shown in FIGURES 2 and 6;

FIGURE 8 is a side elevation view of the part shown in FIGURE 7 with parts shown in dotted lines to show their working relationship.

The fishing apparatus of the present invention is constructed for retaining a fishing rod 6 having a fishing line 7 carried thereon and consists briefly of a support 8, a fishing rod holder 9 carried by the support for movement between cocked (see FIGURE 1 full lines) and uncocked positions (see FIGURE 1 dotted lines), resilient means 11, here shown as a helical spring, urging holder 9 to uncocked position, trip means 12 retaining the holder in cocked position, and including a trigger arm 13 having a predetermined increment of displacement (see FIGURE 1 and arrows designated 14) functioning to release the holder from cocked position and being adapted for connection to the fishing line and being responsive to a predetermined pull by a fish 16 for effecting the increment of displacement, and manually operable means 17 for selectively varying the predetermined increment of displacement of the trigger arm.

In fishing for certain species of fish it is desirable to require a fish to take the bait, swim with the line a predetermined distance before triggering the device so as to set the hook in the fish's mouth. Two distinct and separate mechanisms have been provided to effect this result. Trigger arm 13 is pivoted for rotation about point 19. As seen in FIGURE 1, trigger arm 13 describes an arc at its furthest end point 21 roughly the distance shown by arrows 14. By placing the string on the trigger progressively closer to the pivot 19 the string moves a proportionately shorter distance when the trigger moves from the position shown in solid lines to the position shown in dotted lines. The trigger arm 13 is therefore provided with spaced fishing line retaining means, such as the plurality of ridges 22, 23, 24 and 25, each adapted to engage and retain the fishing line 7 as best shown in FIGURE 1. Thus when the line 7 is attached to ridge 22 it will travel further than when the line is attached to ridge 25 and thus the fish will have to pull the line further when it is attached to ridge 22 than when attached to ridge 25.

A still further refinement of the distance type control described immediately above and which provides even more sensitive distance control is the provision of trip means 12 including a member 26 connected to trigger arm 13 at surface 27 to provide an operating connection for holding holder 9 in cocked position. Manually operable means 29 provide the control for determining the predetermined increment. Means 29 here includes a shaft 31 pivotally connected to support 8 having a cam surface 32 fixedly mounted thereon for engagement with arm 13 and a wheel 33 for manual engagement. Merely turning wheel 33 selects the distance a fish must pull the line before the trigger will trip and uncock the holder. To prevent the shaft 31 from rotating freely, a ball 34 and detent notches 36 are provided in the surface of cam 32. A light spring 37 seated in depression 38 formed in support 8 engages ball 34 and biases it to slot 36.

In addition to the two controls for adjusting the distance a fish must pull the line, there are two distinct means for controlling the force which must be exerted on the line to move the trigger to a releasing position and thus uncock the holder 9. The first means is discussed immediately herebelow and the second is discussed at a later point.

As set forth above, trigger arm 13 consists of a lever arm pivoted about shaft 19 and formed with string holding ridges. When a light tripping force is desired, the long lever arm is utilized and string 7 is placed on ridge 22. If a hard setting is required which will take a larger force on the line, the string is set on ridge 25.

When the present apparatus is used for fishing with heavy rods, in deep waters or for large fish, it is necessary to the successful operation of the device that the initial inertia of the heavy rod or drag of the increased length of line and heavy sinkers be overcome to permit the holder to move rapidly at the beginning of the pull so as to set the hook in the fish's mouth before it has a chance to turn loose the bait and hook. The device is here provided with a booster spring 39 positioned for engagement with the holder 9.

Where fishing conditions do not require the use of a booster spring, the present device provides means for selectively moving the booster spring to operative and inoperative positions. This selectivity is accomplished by mounting spring 39 on lever arm 41 pivotally mounted on shaft 42. Spring 39 rests in depression 43 formed in arm 41. Arm 41 is selectively moved in and out of engagement by means of cam 44 pivotally mounted on shaft 46. A handle 55 may be provided on shaft 46 for manually moving the booster spring 39 in and out of engagement with holder 9. As a convenience to setting the booster spring, a member 40 formed with a slot 45 is mounted for rotation on shaft 46 and moves in and out of engagement with stub shaft 50 in registration with the slot.

Another major feature of the present device is automatic latching. The mechanism is automatically cocked and held in the cocked position by merely placing the fishing rod 6 in holder 9 and moving the rod holder from the uncocked position shown in dotted lines in FIGURE 1 to the cocked position shown in full lines. Thus with one simple motion the fisherman can cock the mechanism with one hand and with the other hand place the string 7 on the desired ridge of the trigger arm and the mechanism is made ready to catch a fish. This automatic latching is accomplished by an arrangement of parts consisting of a main spring 11 attached to support 8 and holder 9 at shaft 47, holder 9 pivotally mounted on shaft 48, a first lever means 26 pivotally mounted on shaft 42 and having a short arm 51 formed with a catch 52 for engagement with a surface 53 formed in a cam 54 mounted for rotation with holder 9, and having a long member arm 26, a trigger arm 13 mounted for rotation on shaft 19 and having a surface 27 formed therein for engagement with member 26. In operation of the latching mechanism the parts are in the following positions: trigger arm 13 is biased by its own weight in a direction shown by arrow 56. Member 26 is biased in a counterclockwise direction as shown in FIGURE 2 by the force of a helical spring 57 attached to member 26 and support 8. End 58 of short arm 51 is biased against cam face 59 of cam 54. Holder 9 is positioned as shown in dotted lines in FIGURE 2. In operation, when holder 9 is moved in the direction of the arrow 61 as seen in FIGURE 2, end 58 is permitted to ride free of cam face 59 when catch 52 reachs surface 53. As holder 9 continues to move in the direction of arrow 61, arm 26 is permitted to rotate in a counterclockwise direction and end 62 moves against cam surface 63 raising trigger arm 13 in the direction shown by arrow 64. As end 62 reaches surface 27 of arm 13, arm 13 reverses in direction under the biasing force of its own weight and moves in the direction of arrow 56. End 62 is then brought into engagement with surface 27 and restrains arm 26 from moving in the direction of arrow 66. Catch 58 in engagement with surface 53 restrains holder 9 from moving in the direction of arrow 67 against the biasing force of spring 11. Thus by the simple movement of holder 9, the parts are arranged automatically in a cocked position.

The present device uses a heavy spring 11 which is capable of moving holder 9 to an uncocked position with great speed and force if the fishing pole is not attached in the holder. As a safety precaution it is desirable to prevent movement of the holder unless the fish rod is present therein. To effect this safety feature a U-shaped slot 71 having legs 72 and 73 and a connecting channel 74 therebetween formed on an arc concentric with the axis of rotation of shaft 48 is formed in support 8. A pin 76 is formed and dimensioned to ride in slot 71 and is positioned through an opening 77 in holder 9. Leg 73 of slot 71 is positioned so that when holder 9 is in the cocked position and pin 76 is in leg 73, holder 9 is locked and cannot rotate to the uncocked position. In like manner, leg 72 of slot 71 is so positioned that when holder 9 is in the fully uncocked position as shown in dotted lines in FIGURE 2, pin 76 will be moved into leg 72 and the holder will be locked in the uncocked position. Pin 76 is automatically moved into the legs of the slot in the fully cocked and fully uncocked position by spring 81 in engagement with pin 76 and shaft 48. In order to move pin 76 to a holder releasing position, a release button 82 is mounted in the holder 9 in engagement with pin 76 protruding from wall 83 of holder 9 so as to be engageable by the end of the fishing rod 6.

Another novel feature of applicants' device is the control setting a wide variation of force required to be exerted on the fishing line in order to move trigger 13 to a holder uncocking position. This variation in control is obtained by two simple adjustments, namely, the preselected position of trigger 13 about its pivot point 19 and the adjustment of the tension on spring 11 by means of adjustment screw 78 attached to an internally threaded collar 79 on spring 11. Screw 78 is held by support 8 by means of a bracket 80. The parts of the device are so arranged that a tensioning force on spring 11 travels through the linkage chain so as to exert a force on trigger arm 13. The parts are further arranged so that the moment of rotation exerted on pivoted trigger arm 13 reverses depending upon the preselected positioning of trigger arm 13. For example, when trigger arm 13 is in the position shown in FIGURES 1 and 6 shown in full lines, the moment of rotation is clockwise about pivot point 19, thus increasing the force necessary to uncock the device in direct proportion to the amount of tension on spring 11. Conversely, when the trigger is in the raised position as shown in dotted lines in FIGURES 1 and 6 the moment of rotation about pivot point 19 is counterclockwise and less force is necessary to trigger the mechanism and uncock the device in direct proportion to the tensioning on spring 11. This unique control is effected by providing a slot 84 in trigger arm 13 having a surface 27 for slidably receiving end 62 of lever 26 at a position relative to pivot point 31. Thus to increase the force necessary to move trigger 13, trigger arm 13 is rotated in a clockwise direction to the position shown in FIGURES 1 and 6 in full line. In this position, end 62 assumes a position adjacent end 87 of surface 27. In this position, end 62 exerts a clockwise moment of rotation about pivot 19 thus opposing counterclockwise forces necessary to move trigger 13 to a trigger releasing position and a holder uncocking position. If the fisherman wishes to increase the force necessary to unlatch the trigger, he merely increases the tension on spring 11 by tightening screw 78. If the fisherman desires less force to release the trigger he has three means of adjustment. One, he can release the tension on spring 11; two, he can move trigger arm 13 in a counterclockwise direction to a preselected position; or three, he can place string 7 on any one of ridges 23 through 25.

When the trigger arm 13 is moved counterclockwise as shown in FIGURE 6, end 62 assumes a position on surface 27 further removed from end 87 and accordingly the clockwise moment of rotation about pivot point 19 is reduced until a point is reached at dead center where the tension on spring 11 has no effect on trigger arm 13. Thus in the dead center position the fisherman has the choice of putting any amount of tension on spring 11 without affecting the sensitivity of trigger 13. Sensitivity in releasing trigger 13 in the dead center position can be obtained by moving the string 7 on any one of the five or more ridges in the trigger arm.

In order to obtain a very sensitive trigger the trigger arm 13 may be rotated in a counterclockwise direction so that end 62 moves to a position closer to end 86 on surface 27. As end 62 passes dead center, the moment of rotation about point 19 reverses and as end 62 moves closer to end 86 of surface 27 the counterclockwise moment of rotation increases thus making it very easy to trip trigger 13 and uncock holder 9. In rotating trigger arm 13 in a counterclockwise direction to various selected positions, end 62 moves downward slightly in an arc about pivot 42, while surface 27 changes in sloping position. Initially end 87 is lower than end 86 but as trigger arm moves counterclockwise, their relative elevational positions reverse.

A skilled fisherman, using the device constantly, can estimate the position of trigger 13 and the tensioning of spring 11 to catch various species of fish. In most cases, however, it is desirable to be able to return the trigger 13 to the precise position for various species of fish and to accomplish this cam 32 as above described is provided to move trigger arm 13.

In operation, the mechanism is mounted on a pivotal support 91 which can be attached to a boat railing, ground stake or other suitable support. The desired setting of the mechanism is selected by moving trigger 13 by means of cam 17 mounted on shaft 31 and being formed with a slot 93 positioned in registration with a stub shaft 94 to limit rotation of the cam. The desired amount of tensioning of spring 11 is then selected by turning screw 78. If additional booster spring 39 is required, shaft 46 is rotated forcing cam 44 against arm 41 elevating spring 39 into position. Trigger arm 13 is rotated clockwise into abutment with cam 32 thus making the apparatus ready for cocking. To automatically cock the apparatus holder 9 is rotated in a clockwise direction until the parts latch as set forth fully above. The operator then loops string 7 beneath trigger arm 13 so as to bring it into engagement with one of the ridges 22–25 and the apparatus is operational.

When fish 16 takes the bait and pulls with sufficient force to overcome the preselected increment of displacemetn and the force setting, trigger arm 13 rotates in a counterclockwise direction as shown in FIGURE 2 about its pivotal axis 19, surface 27 moves from beneath end 62 of arm 26 permitting first lever means 26 to rotate in a clockwise direction about its pivotal axis 42 as seen in FIGURE 2, catch 52 releases from surface 53 of cam 54 and holder 9 rotates rapidly in a counterclockwise direction as seen in FIGURE 2 until butt end 100 moves against stop means 101 mounted on holder 9. The fisherman then removes fishing rod 6 from the holder, plays the fish and reels it in on reel 102.

The parts of the mechanism are completely enclosed except for the sturdy holder and the trigger mechanism. To prevent damage to the trigger arm 13, it may be rotated in a counterclockwise direction as seen in FIGURE 2 until the arm is completely enclosed in the support 8. A spring loaded ball 96 reciprocally rides in detent means 97 and engages cam 98 mounted for rotation on axis 19 to prevent accidental movement of the trigger out of the casing.

We claim:

1. Fishing apparatus for retaining a fishing rod having a fishing line carried thereon comprising, a support, a fishing rod holder carried by said support for movement between cocked and uncocked positions, resilient means urging said holder to uncocked position, trip means retaining said holder in cocked position and including a trigger arm having a predetermined increment of displacement functioning to release said holder from cocked position and being adapted for connection to the fishing line and being responsive to a predetermined pull thereon for effecting said increment of displacement, manually operable means for selectively varying said predeterminel increment of displacement of said trigger arm, and resilient booster means engageable with said holder when it is in cocked position and adapted to urge said holder from cocked to uncocked positions, said booster means being adapted to engage and urge said holder only during an initial portion of its travel from cocked to uncocked position.

2. The fishing apparatus of claim 1 wherein said resilient booster means is selectively movable between operative and inoperative positions, said booster means when in said inoperative position being spaced from said holder when in its cocked position, said booster means when in said operative position being engageable with said holder when in its cocked position.

3. Fishing apparatus for retaining a fishing rod having a fishing line carried thereon comprising, a support, a fishing rod holder pivotally mounted on said support and movable between cocked and uncocked positions, resilient means for urging said holder to uncocked position, first lever means positionable for releasably retaining said holder in cocked position and being movable to release said holder for movement under the force of said resilient means, second lever means releasably connected to said first lever means for retaining said holder in cocked position, said second lever means including a trigger arm adapted for engagement with and for displacement by said fishing line, said second lever means being adapted to disengage said first lever means upon a predetermined increment of said displacement of said trigger arm whereupon said first lever means becomes movable to release said holder for movement to uncocked position, and means for varying said predetermined increment of displacement of said trigger arm necessary to release said first lever means and thereby permit said resilient means to move said holder to its first position.

4. Fishing apparatus for retaining a fishing rod having a fishing line carried thereon comprising, a support, a fishing rod holder carried by said support for movement between cocked and uncocked positions, resilient means urging said holder to uncocked position, first lever means releasably retaining said holder in cocked position and being movable to release said holder for movement under the force of said resilient means, second lever means releasably holding said first lever means in position retaining said holder in cocked position against the action of said resilient means, said second lever means including a trigger arm adapted for engagement with and for displacement by said fishing line, said second lever being adapted to disengage said first lever means upon a predetermined increment of said displacement by said trigger arm whereupon said first lever means becomes movable to release said holder for movement to uncocked position, and a manually engageable trigger adjustment member movably mounted on said support and positioned for abutting engagement with said trigger arm, said adjustment member determining the position of said second lever when it engages said first lever and thereby determining said predetermined increment of displacement of said trigger arm to disengage said first lever.

5. Fishing apparatus for retaining a fishing rod having a fishing line carried thereon comprising, a support, a fishing rod holder including a socket carried by said support for movement between cocked and uncocked positions, resilient means urging said holder to uncocked position, trip means retaining said holder in cocked position and being adapted for connection to the fishing line and being responsive to a pull thereon to release said holder from cocked position, means carried by said holder and having a biased position locking said holder in cocked position against the operation of said trip means when a fishing rod is absent from said holder and being positioned for engagement with a fishing rod mounted in said holder for displacement thereby from biased position to thereby release said holder.

6. Fishing apparatus for retaining a fishing rod having a fishing line carried thereon comprising, a support, a fishing rod holder carried by said support for movement between cocked and uncocked positions, resilient means urging said holder to uncocked position, a trigger arm pivotally mounted on said support and being adapted for engagement with and displacement by said line, means connecting said trigger arm and holder and transmitting the force of said resilient means to said trigger arm and having a part releasably engaging a surface of said trigger arm astride its pivotal connection for holding said holder in cocked position, said trigger arm being movable to a plurality of selectable first positions within a predetermined increment while maintaining engagement of said part and surface and to a second position releasing said part from said surface to release said holder from cocked position, said surface and part being formed for changing the magnitude and direction of said force acting upon said trigger arm depending upon the preselection of said first position of said trigger arm for changing the pulling force on said line necessary to move said trigger arm said predetermined increment of displacement for uncocking said holder.

References Cited by the Examiner

UNITED STATES PATENTS

| | | | |
|---|---|---|---|
| 625,829 | 5/99 | Cook | 43—15 |
| 2,703,465 | 3/55 | Di Stefano | 43—15 |
| 2,744,351 | 5/56 | Smith | 43—16 |
| 2,783,575 | 3/57 | Housel | 43—16 |
| 2,918,746 | 12/59 | Hamrick | 43—15 |
| 2,964,868 | 12/60 | Bennett | 43—15 |
| 3,055,136 | 9/62 | Scott et al. | 43—15 |

SAMUEL KOREN, *Primary Examiner.*